Figure 1:
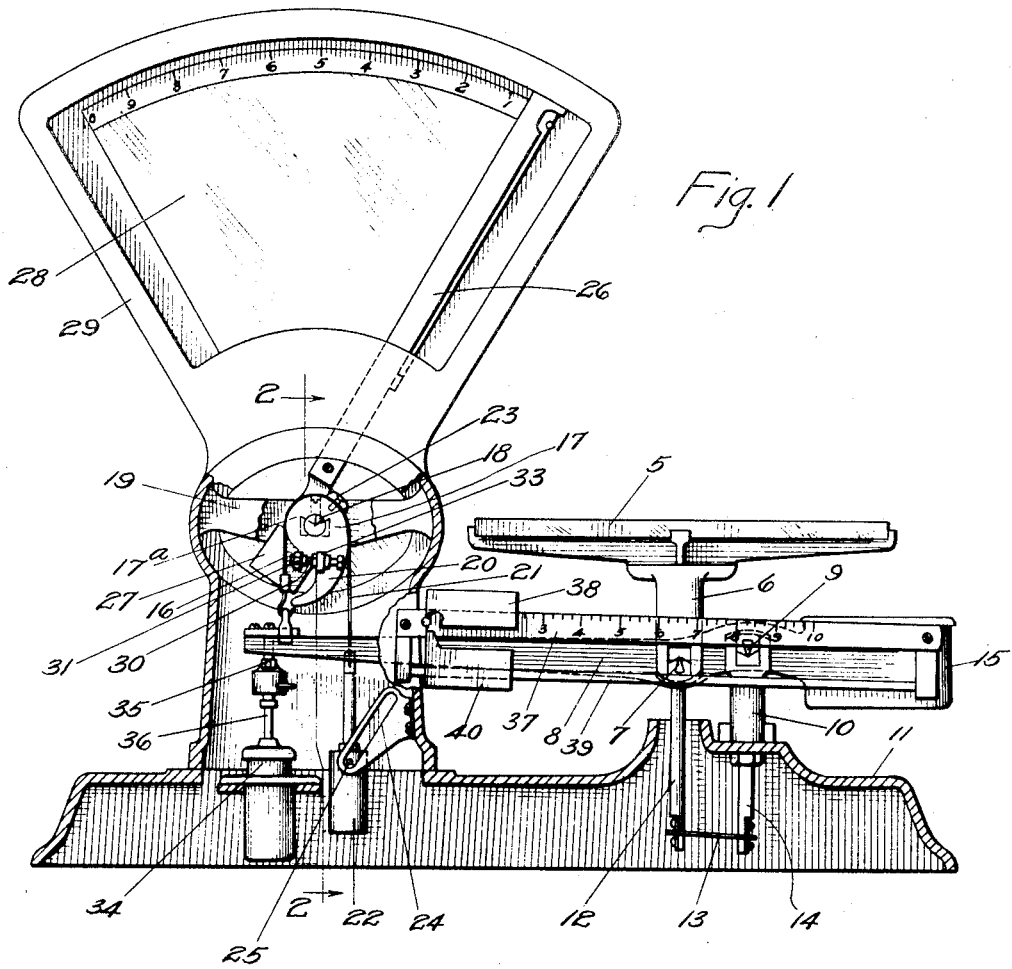

J. HOPKINSON.
COMPUTING SCALE.
APPLICATION FILED OCT. 18, 1913.

1,140,825.

Patented May 25, 1915.
2 SHEETS—SHEET 1.

WITNESSES

INVENTOR
Joseph Hopkinson
BY
ATTORNEYS

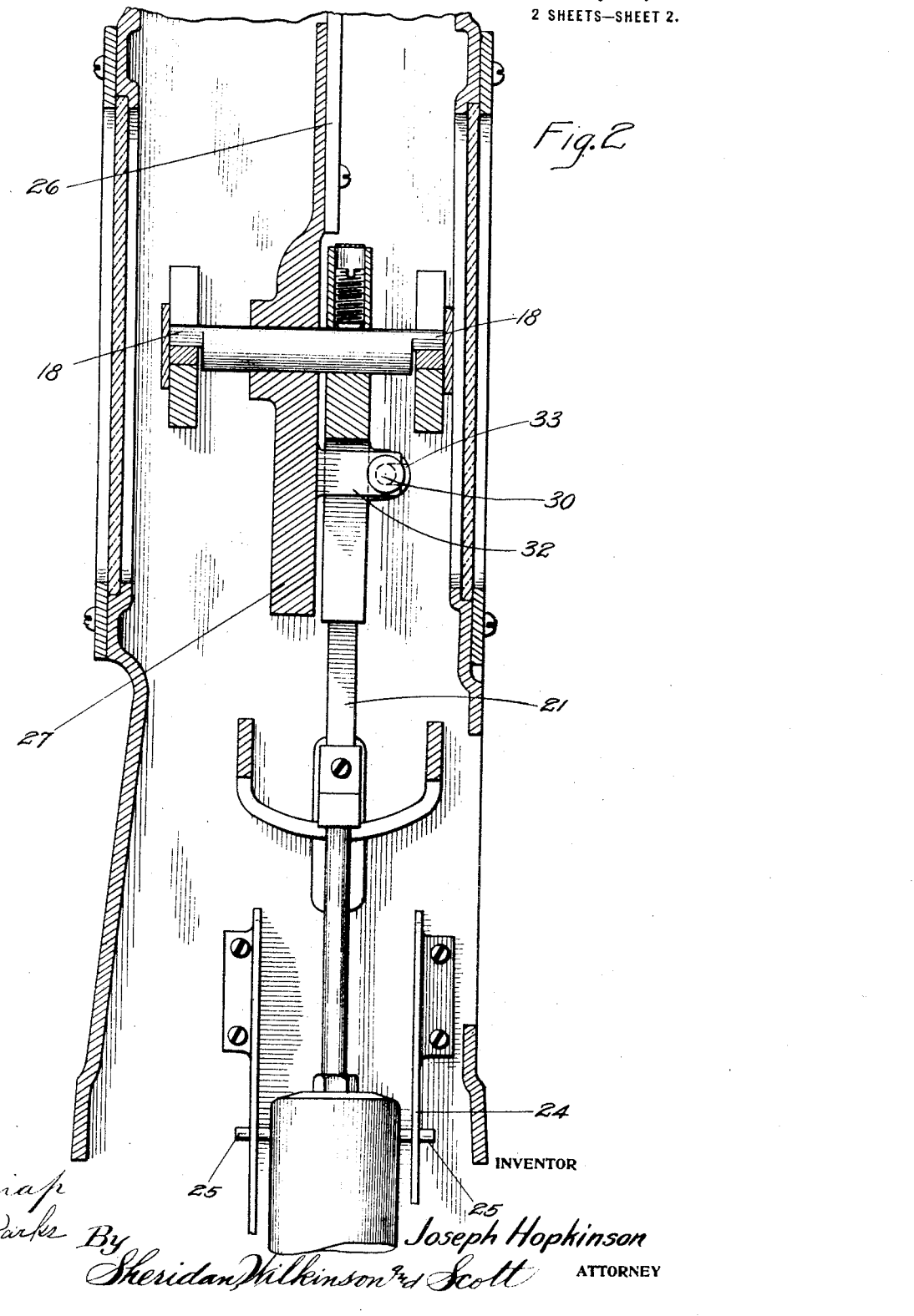

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

COMPUTING-SCALE.

1,140,825. Specification of Letters Patent. Patented May 25, 1915.

Application filed October 18, 1913. Serial No. 796,020.

*To all whom it may concern:*

Be it known that I, JOSEPH HOPKINSON, a citizen of the United States, residing at Dayton, in the county of Montgomery and State of Ohio, have invented certain new and useful Improvements in Computing Scales, of which the following is a specification.

My invention relates to automatic scales of the class known as computing scales.

My object is to produce a scale of this character with improved mechanism for accurately transmitting the forces produced by the commodity on the scale platform to the computing and indicating elements.

My invention comprises a suspended weight carried by a flexible element rolling upon an arm of variable radius which resists the forces that cause the movements of the computing and indicating elements with an increasing resisting moment. This moment varies uniformly about the axis of rotation while the mechanism moves away from its normal position.

My invention also comprises means actuated by the commodity being weighed, to produce a variable turning moment on said elements through a flexible member rolling upon an arm of invariable radius.

My invention also comprises a computing chart placed within an upright portion of the frame extending above the level of the platform.

A further object of my invention is to provide means for preventing oscillation of the suspended weight and thereby to remove any inaccuracies in the scale due to this cause.

Another object is to provide means for adjusting the correct relation of the indicating elements to the movements of the platform.

A further object is to produce a simple, compact, accurate and efficient form of scale for the purposes described.

Other objects and advantages of my improved scale will be rendered apparent in the following specification when taken in connection with the accompanying drawings in which,—

Figure 1 is a side elevation partly in section of a scale containing my improvements; Fig. 2 is a vertical section thereof taken along the line 2—2 of Fig. 1.

It will be seen that I have provided a platform or commodity supporting element 5 which rests through knife-edge bearings 7 on a lever 8. The upright post 6 supports the platform a suitable distance above said bearings.

The lever 8 is provided with knife-edge bearings 9 which are supported by and fixed to the base 11 by means of a post 10.

A downwardly projecting rod or arm 12 fixed to the platform post 6 is movably connected with a downwardly projecting post 14 fixed to the base 11. The movable connection which performs this function is the link 13, which is pivotally attached at its ends to the parts described by knife-edge bearings.

The lever 8 is provided with a counterweight 15 whereby the long arm of said lever and the platform 5 and associated parts are counter-balanced and adapted to move freely about the knife-edge bearings 9. The extremity of the long arm 8 is pivotally connected with a flexible member or tape 16 which rolls upon the hub or short arm 17$^a$ of an equalizing lever 17. This equalizing lever is provided with knife-edge bearings 18 which are supported by the transverse beam or frame member 19 within the casing of the machine.

The equalizing lever 17 is provided with another arm 20 of greater length, having a curved face upon which another flexible member or tape 21 is wound or rolled. To the lower extremity of this tape is attached a suspended weight 22. The tapes 21 and 16 are fixed at their upper extremities to the equalizing lever 17 by suitable clamping devices comprising a screw 23. I preferably combine the tapes 21 and 16 in a single tape held by a single screw 23 as shown in the drawings.

The suspended weight 22 is guided by pins 25 fixed therein, said pins being adapted to slide in an inclined guideway 24 fixed to the base of the machine. The guideway 24 is duplicated on the opposite side of the suspended weight as shown in Fig. 2, there being also a second pin 25 adapted to move therein. It will be observed that the pins 25 do not contact with the sides of the guideways, but are sufficiently close to them to cause them to prevent oscillation of the suspended weight.

Fixed to the equalizing lever 17 is an indicating arm 26, which sweeps across a computing chart 28 when the commodity is placed upon the platform 5. The computing chart 28 is inclosed in a casing 29 which is formed of an upwardly projecting portion of the casing of the machine. The counterweight 27 is fixed to said equalizing lever opposite to said arm 26 and serves as a counter-balance therefor.

I provide means for adjusting the angular relation between arm 26 and the equalizing lever 17, said means consisting of a tangent adjusting screw 30, which has a bearing 31 in the counter-balance 27, and also a bearing 33 fixed to the equalizing arm. The bearing 31 comprises an outwardly projecting lug 32 with a notched end, in which the pin rests. Shoulders or collars at either side of said lug retain the adjusting screw in position.

Lock nuts at either side of the lug 33 provide means for locking the parts in their adjusted positions.

I provide a dash-pot 34 which I place in the base of the machine, the plunger stem 36 of which is pivotally attached to the extremity of the lever 8 by the pin 35.

I provide an auxiliary scale beam 37 upon which slides the auxiliary weight 38, as is usual in scales of this character. I also provide a second auxiliary weight 40 which slides upon a bar 39.

In the equalizing lever 17 the concentric portion 17$^a$ may be changed to a curved arm similar to arm 20. It would then be necessary only to make the variable radius thereof and of the arm 20 have such relation that the movements of the indicating arm will properly represent the weights of the commodities on the platform.

In the use and operation of my improved scale the commodity is placed upon the platform 5 and the downward pressure thereof causes a downward movement of the lever 8, said platform being maintained in stable equilibrium, or in an upright position by the link 13. The downward movement of the lever 8 produces a downward pull upon the tape 16, which in turn, by means of the circular portion of the arm 17$^a$, causes a rotary motion of the equalizing lever 17.

The rotary motion of said equalizing lever causes its long curved arm 20 to wind upon or roll upon it the tape 21. The tape 21 raises the suspended weight 22 and said weight moves in an inclined upward direction as is obvious from an inspection of the drawings.

The guides 24 are so placed that the pins 25 will not contact therewith but will prevent appreciable oscillation of said weight.

The curved form of the arm 20 is so proportioned as to cause the resisting moment of the tape 21 to increase in a uniform manner, and in such a manner as to cause equal increments of load upon the platform 5 to cause corresponding increments of movement of the indicating arm 26 across the computing chart 28.

While I have described my invention more or less precisely as regards the details of construction, I do not wish to be restricted to them unduly, for the reason that I contemplate changes in the form, in the proportion of the parts, and substitution of equivalents, as circumstances suggest, or render expedient, without department from the spirit of my invention.

What I claim as new and desire to secure by Letters Patent is,—

1. In a device of the character described, a main lever, a commodity supporting element mounted on said lever at one side of its fulcrum, a weight, a flexible supporting element attached to said weight, an equalizing lever having a curved surface at one end, said flexible element being attached to said lever and adapted to roll upon said curved surface, the weight always hanging vertically by the said flexible element from said equalizing lever and moving in an inclined path as said lever turns, a second flexible element connecting the opposite arm of said equalizing lever with the end of said main lever upon which said commodity supporting element is mounted, both said flexible elements pulling down on said equalizing lever and both lying in the same vertical plane transverse to the axis of said lever, and weight and value-indicating means operated by said equalizing lever.

2. In a device of the character described, a main lever, a commodity supporting element mounted on said lever at one side of its fulcrum, a weight, a flexible supporting element attached to said weight, an equalizing lever having a curved surface at one end, said flexible element being attached to said lever and adapted to roll upon said curved surface, a second flexible element connecting the opposite arm of said equalizing lever with the end of said main lever upon which said commodity supporting element is mounted both said flexible elements pulling down on said equalizing lever and both lying in the same vertical plane transverse to the axis of said lever, a guide for said weight, said guide not contacting with said weight when hanging vertically, and a weight and value-indicating means operated by said equalizing lever.

3. In a device of the character described, a commodity supporting element, an equalizing lever having a curved surface at one end, a connection from said element to the other end of said lever, said connection comprising a member pulling down on the end of the equalizing lever to which it is attached, a weight, and a flexible element connecting said weight to said equalizing lever whereby said flexible element is adapted to roll on said curved surface, said connection and said flexible element both lying in a vertical plane transverse to the axis of said lever, and said flexible element always hanging vertically and said weight moving in an inclined path.

4. In a device of the character described, a commodity supporting element, an equalizing lever supported on an intermediate knife edge and having a curved surface at one end, a connection from said element to the other end of said lever, said connection comprising a member pulling down on the end of the equalizing lever to which it is attached, a weight, and a flexible element connecting said weight to said equalizing lever whereby said flexible element is adapted to roll on said curved surface, said connection and said flexible element both lying in a plane perpendicular to said knife edge.

5. In a device of the character described, a main lever, a commodity supporting element mounted on said lever at one side of its fulcrum, a weight, a flexible member supporting said weight, a second flexible member attached to said main lever, an equalizing member attached to both said flexible elements, both said flexible members pulling down on said equalizing member, and both lying in the same vertical plane transverse to the axis of said lever, the moment of said weight increasing when a commodity is placed on said supporting element, and weight and value-indicating means operated by said equalizing member.

6. In a device of the character described, a main lever, a commodity supporting element mounted on said lever at one side of its fulcrum, a weight, a flexible member supporting said weight, a second flexible member attached to said main lever, an equalizing member attached to both said flexible members, both said flexible members pulling down on said equalizing member, and both lying in the same vertical plane transverse to the axis of said lever, the moment of said weight increasing when a commodity is placed on said supporting element, the moment exerted by said main lever upon said equalizing lever being through an invariable radius, and weight and value-indicating means operated by said equalizing member.

7. In a device of the character described, a main lever, a commodity supporting element mounted on said lever at one side of its fulcrum, a weight, a guide for said weight, said guide not contacting with said weight when hanging vertically, a flexible member supporting said weight, a second flexible member attached to said main lever, an equalizing member attached to both said flexible members, both said flexible members pulling down on said equalizing member, and both lying in the same vertical plane transverse to the axis of said lever, the moment of said weight increasing when a commodity is placed on said supporting element, the moment of said weight increasing when a commodity is placed on said supporting element, the moment exerted by said main lever upon said equalizing lever being through an invariable radius, and weight and value-indicating means operated by said equalizing members.

8. In a device of the character described, a main lever, a commodity supporting element mounted on said lever at one side of its fulcrum, a weight, a flexible supporting member attached to said weight, an equalizing lever having a curved surface at one end, said flexible member being attached to said lever and adapted to roll upon said curved surfaces, a second flexible member connecting the opposite end of said equalizing lever with said main lever, both said flexible members pulling down on said equalizing lever, and both lying in the same vertical plane transverse to the axis of said lever, weight and value-indicating means operated by said equalizing lever, and means for adjusting the relation of said equalizing lever to said indicating means.

9. In a device of the character described, a main lever, a commodity supporting element mounted on said lever at one side of its fulcrum, a weight, a flexible supporting member attached to said weight, an equalizing lever having a curved surface at one end, said flexible member being attached to said lever and adapted to roll upon said curved surface, a second flexible member connecting the opposite end of said equalizing lever with said main lever, both said flexible members pulling down on said equalizing lever, and both lying in the same vertical plane transverse to the axis of said lever, weight and value indicating means operated by said equalizing lever, means for adjusting the relation of said equalizing lever to said indicating means, and means for counterbalancing said indicating means.

10. In a device of the character described, a main lever, a commodity supporting element mounted on said lever at one side of its fulcrum, a weight, a flexible supporting member attached to said weight, an equalizing lever having a curved surface at one end, said flexible member being attached to said lever and adapted to roll upon said curved surface, a second flexible member connecting the opposite end of said equalizing lever with said main lever, both said flexible members pulling down on said equalizing lever, and both lying in the same vertical plane transverse to the axis of said lever, weight and value-indicating means operated by said equalizing lever, means for adjusting the relation of said equalizing lever to said indicating means, means for counterbalancing said indicating means, and a dash-pot connected with said main lever.

11. In a device of the character described, a main lever, a commodity supporting element mounted on said lever at one side of its fulcrum, a weight, a flexible supporting element attached to said weight, an equalizing lever having curved surfaces at its ends, said flexible element being attached to said lever and adapted to roll upon one of said curved surfaces, a second flexible element connecting the opposite arm of said equalizing lever with the end of said main lever upon which said commodity supporting element is mounted. both said flexible members pulling down on said equalizing lever, and both lying in the same vertical plane transverse to the axis of said lever, weight and value indicating means operated by said equalizing lever the moment of said weight on said equalizing lever increasing relatively to the moment of the pull of said main lever on said equalizing lever.

In testimony whereof, I have subscribed my name.

JOSEPH HOPKINSON.

Witnesses:
A. S. HENDRICKS,
H. A. LEONARD.